June 16, 1953 W. W. FRITSCHI ET AL 2,642,500

VOICE FREQUENCY SIGNALING CIRCUIT

Filed May 1, 1952 5 Sheets-Sheet 1

INVENTORS W. W. FRITSCHI
R. O. SOFFEL
A. WEAVER
BY R. D. Covell
ATTORNEY

VOICE FREQUENCY SIGNALING CIRCUIT

INVENTORS W. W. FRITSCHI
R. O. SOFFEL
A. WEAVER
BY R. O. Covell
ATTORNEY

INVENTORS W. W. FRITSCHI
R. O. SOFFEL
A. WEAVER
BY
R. D. Covell
ATTORNEY

VOICE FREQUENCY SIGNALING CIRCUIT

INVENTORS W. W. FRITSCHI
R. O. SOFFEL
A. WEAVER
BY R. O. Covell
ATTORNEY

VOICE FREQUENCY SIGNALING CIRCUIT

Filed May 1, 1952 5 Sheets-Sheet 5

INVENTORS W. W. FRITSCHI
R. O. SOFFEL
A. WEAVER
BY R. O. Covell
ATTORNEY

Patented June 16, 1953 2,642,500

UNITED STATES PATENT OFFICE 2,642,500

VOICE FREQUENCY SIGNALING CIRCUIT

Walter W. Fritschi, Manhasset, Robert O. Soffel, Hastings on Hudson, and Allan Weaver, Port Washington, N. Y., assignors to Bell Telephone Laboratories, Incorporated, New York, N. Y., a corporation of New York Application May 1, 1952, Serial No. 285,354

11 Claims. (Cl. 179—84)

This invention relates to signaling systems and particularly to systems in which signaling is effected by the transmission of alternating currents of voice frequency.

Objects of the invention are the provision of a reliable and stable signaling means in systems employing voice frequency signaling, the prevention of false operation in response to voice currents or other interfering currents and the provision of means to insure signal current impulses of required minimum and maximum duration to insure the required supervisory and switching operations in response to the signals.

The invention is a signaling system in which signals are transmitted by the initiation and the termination of transmission of alternating current and the transmission of alternating-current impulses of voice frequency, in which the operation of signal responsive devices is delayed to aid in preventing false operation due to speech currents, and in which the repeated signals are of required duration to effect the desired signal response.

A feature of the invention is a signaling circuit unit arranged to transmit and receive impulses of current of a single voice frequency, and having signal and guard tuned networks combined to control, through separate electronic tubes, the operation of a first relay and the delayed operation of an impulse repeating relay responsive to incoming signaling current. A further feature is such a signaling circuit unit with adjustable coupling between the anode of the first tube and grid of a second tube to obtain a desired delay in the operation of the impulse repeating relay and a desired delay in its release, thereby to insure a minimum length of repeated signal. Another feature is a signaling circuit comprising electronic means controlling the repeating of incoming signal impulses and adjustable capacitor charging means for introducing required impulse correction. A further feature is the provision of means in such a signaling circuit unit for momentarily disabling the impulse repeating relay when a signal impulse is transmitted therefrom.

A clear and complete understanding of the invention will be facilitated by considering a system embodying the invention and its features, one such system being represented schematically in the drawing of this specification. The invention is not limited in its application to the system and circuit arrangements shown in the drawings but is applicable generally to any system in which signals are transmitted by voice frequency alternating currents.

Referring to the drawings.

Figure 1:
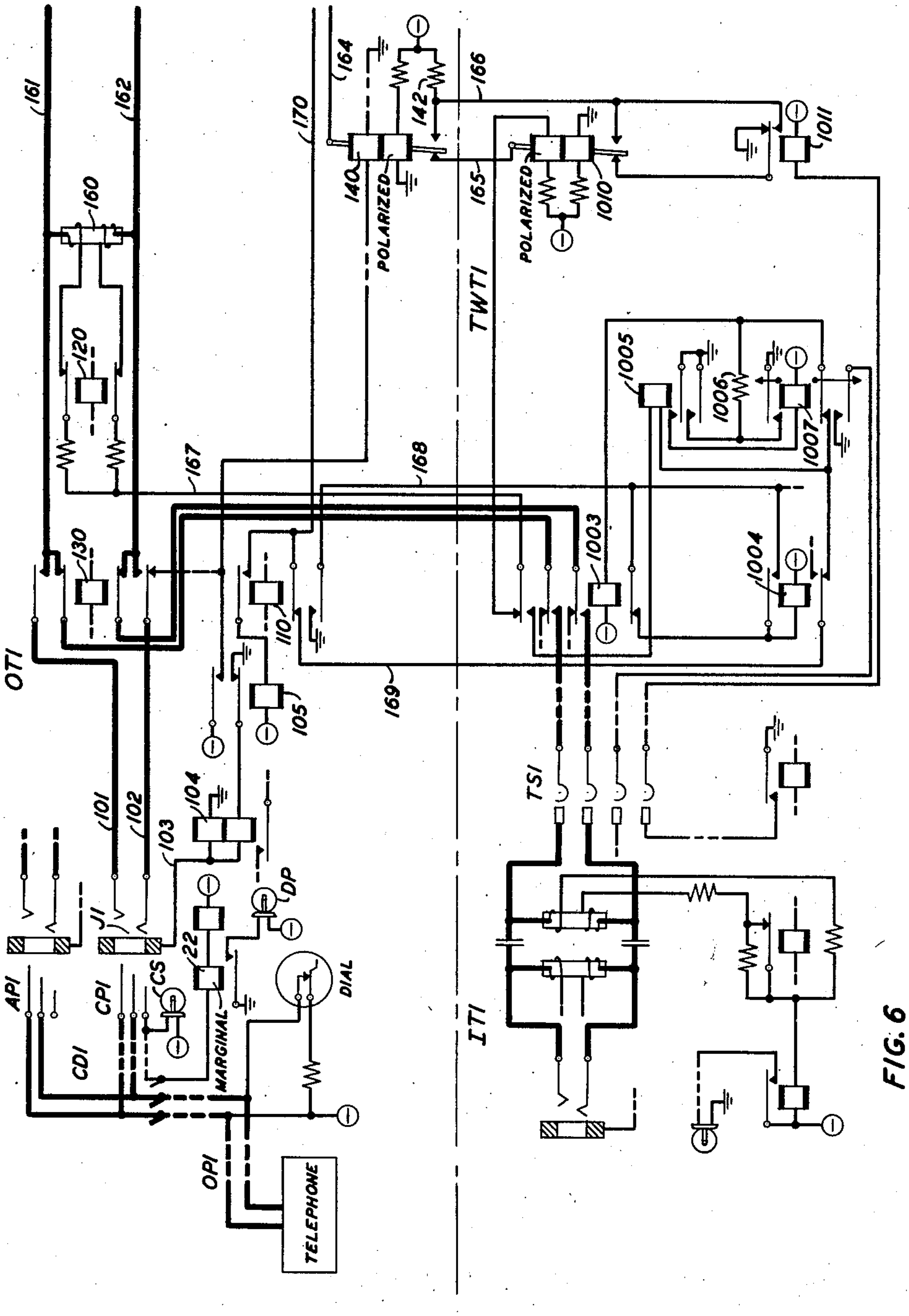
Figs. 1 and 2 represent a first toll office comprising an operator position OP1, an outgoing trunk circuit OT1, a two-way trunk circuit TWT1, a selector TS1, an incoming trunk circuit IT1, and a signal transmitting and receiving circuit SC1.
Figure 6:
Fig. 6 shows the relative positions of the other figures to form an operative arrangement.

The system represented in the drawings includes a plurality of toll offices each of which comprises a toll switchboard with operators' positions and cords for answering calls incoming from manual or dial local offices, from toll subscribers' lines, from community dial offices, and from other toll offices; and for connecting intertoll trunks with switching trunks leading to called manual or automatic offices, to called toll subscribers' lines, to trunks to community dial offices, and to intertoll trunks to other toll offices. Outgoing jacks are connected to switching trunks, toll subscribers' lines, trunks to community dial offices and intertoll trunks. Answering jacks are connected to recording trunks, toll subscribers' lines, trunks from community dial offices and intertoll trunks. Intertoll first selectors and intertoll second selectors, if required, are provided for use on calls incoming over intertoll trunks to establish connections with other toll, local or community dial offices. The operators' positions are provided with dials for use in controlling the operation of intertoll selectors in other toll offices and for controlling the operation of selector and connector switches in local or community dial offices. Reference may be made to Patent 2,209,777 to R. E. King and O. R. Miller of July 30, 1940, and 2,306,236 to J. E. Walsh of December 22, 1942, for a complete disclosure of the cord and operator's position circuits provided in each of the two toll offices for interconnecting calling and called lines and trunks and for controlling the completion of toll calls. The outgoing trunk circuits OT1 and OT2, incoming trunk circuits IT1 and IT2, two-way trunk circuits TWT1 and TWT2, and the toll route selector circuits TS1 and TS2 are all similar to corresponding circuits of the aforementioned King-Miller and Walsh patents. The reference characters applied to trunk circuits OT1, TWT1 and IT1 are the same as applied to like elements in the Walsh patent; and the reference characters applied to trunk circuits OT2, TWT2 and IT2 have the same tens and units digits as like elements in the Walsh patent.

Figure 2:
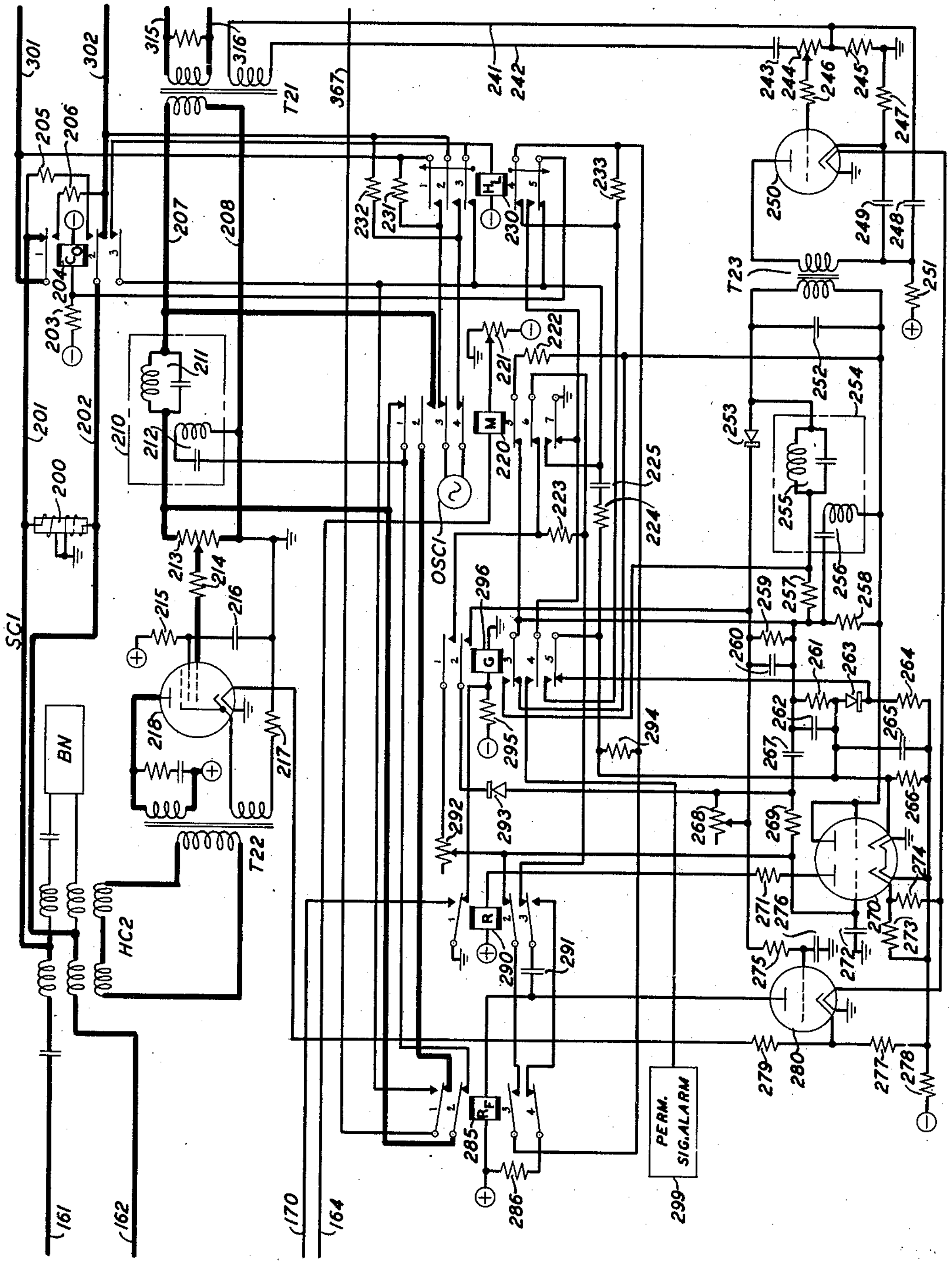
Figure 3A:
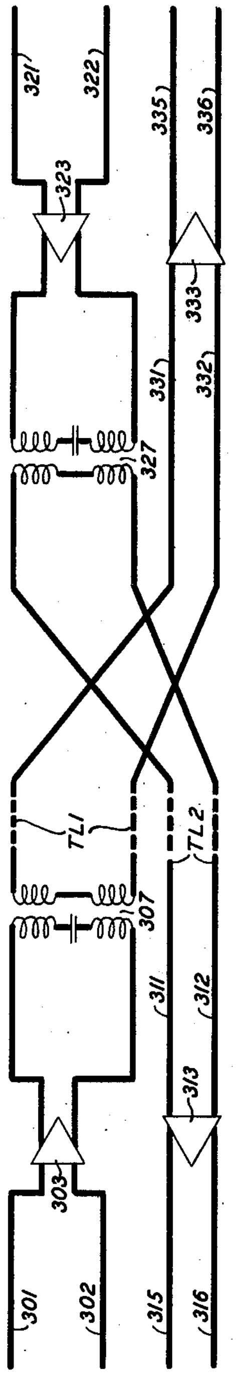
Fig. 3A represents a four-wire transmission channel including amplifying repeaters.
Figure 3B:
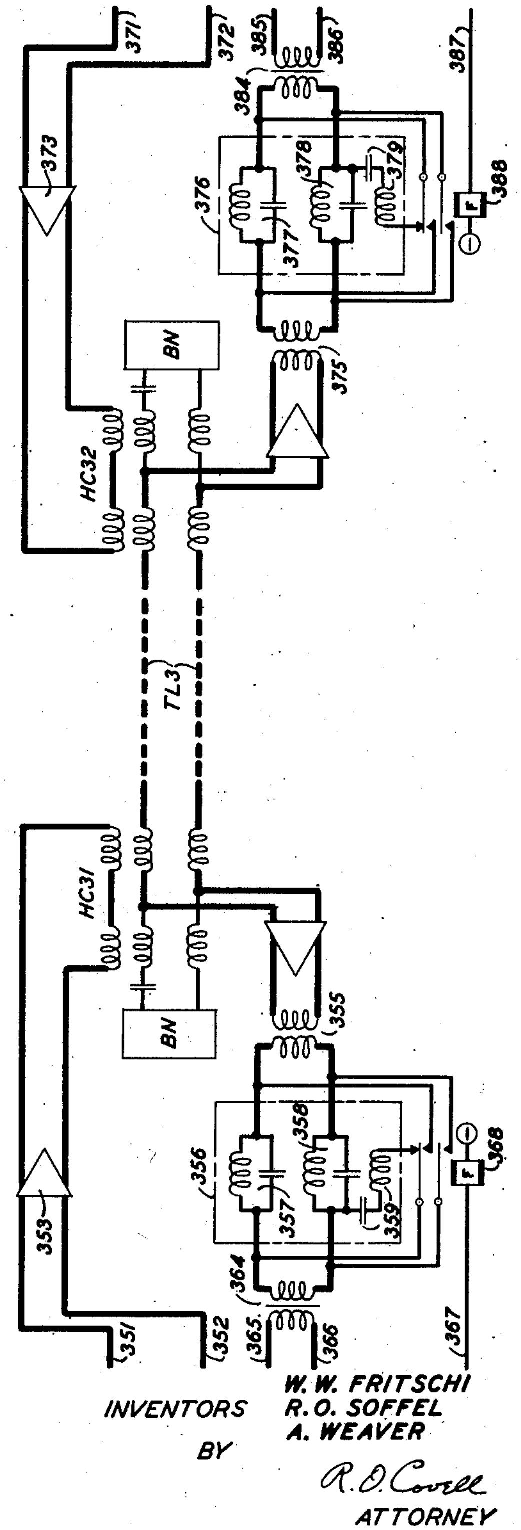
Fig. 3B represents a two-wire line including amplifying repeaters and frequency selective networks.
Figure 4:
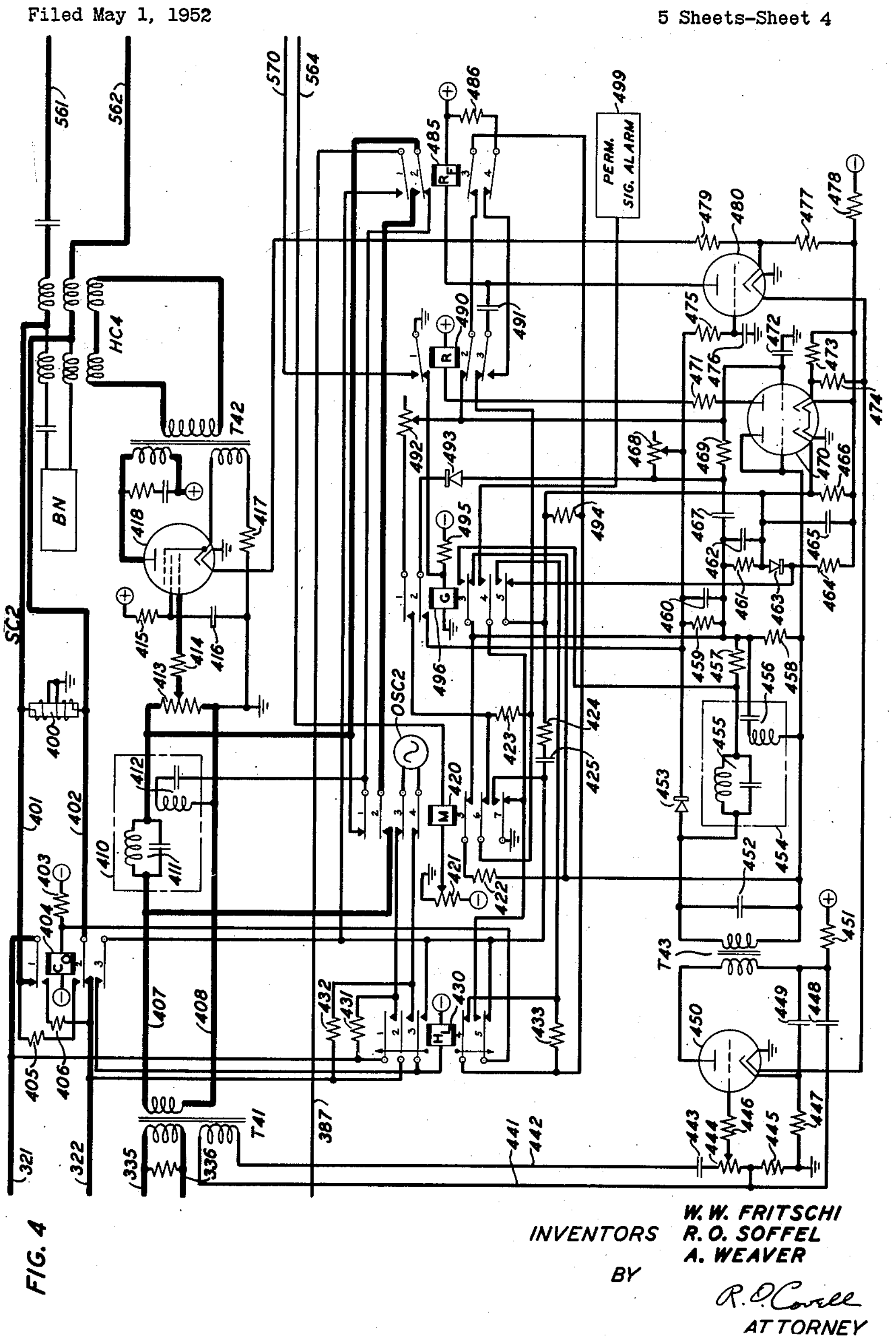
Figs. 4 and 5 represent a second toll office comprising an operator position OP2, an outgoing trunk circuit OT2, a two-way trunk circuit TWT2, a selector TS2, an incoming trunk circuit IT2 and a signaling circuit SC2.

The two toll offices shown in the drawings are interconnected by either four-wire lines or two-wire lines, or a combination of both. A four-wire line is shown in Fig. 3A and comprises two two-wire lines TL1 and TL2. A two-wire line is shown in Fig. 3B and comprises the two-wire toll line TL3. As shown this line includes terminal amplifying repeaters; it may however also include intermediate amplifying repeaters. The illustrations of Figs. 3A and 3B are to be understood as indicating that either a four-wire or a two-wire line may be operatively associated with the signaling circuits SC1 and SC2. In the former case, line TL1 serves to transmit voice currents and signaling current of a particular voice frequency from the first toll office to the second and the line TL2 serves to transmit voice currents and signaling currents of the same particular voice frequency from the second toll office to the first. In case of two-wire line operation, the line TL3 serves to transmit voice currents in both directions, to transmit signaling current of one particular voice frequency in one direction, and to transmit signaling current of a different particular voice frequency in the opposite direction. The frequency used for signaling over a four-wire line may be 2,600 cycles per second; and the frequencies used for signaling over a two-wire line may be 2,600 cycles per second in one direction and 2,400 cycles per second in the other direction. A hybrid coil HC2 individual to trunk circuits OT1 and TWT1 in the first toll office, and a hybrid coil HC4, individual to trunk circuits OT2 and TWT2 in the second toll office, are ararnged to transmit voice currents over the associated two-wire or four-wire toll line between the two toll offices. Balancing networks BN are connected to these hybrid coils in usual and well-known manner. These hybrid coils and balancing networks are shown in Figs. 2 and 4 together with the signaling circuits SC1 and SC2 but, since they are separately mounted, do not constitute a part of these signaling circuit units.

The signaling circuit SC1 comprises conductors 201 and 202 and conductors 301 and 302 for transmitting voice currents from trunk circuits OT1 and TWT1 through hybrid coil HC2 over the associated two-wire or four-wire toll line, shown in Fig. 3A or 3B; a cut-off relay 204 for opening the connection between the hybrid coil HC2 and the associated toll line for a short, desired interval of time whenever the transmission of signaling current is initiated or terminated; and means comprising a transformer T21, conductors 207 and 208, a network unit 210 consisting of networks 211 and 212, a potentiometer 213, an amplifier tube 218 and a transformer T22 for transmitting voice currents from the associated toll line through hybrid coil HC2 to trunk circuits OT1 and TWT1. Relays 220 and 230 control the transmission of signaling current from a tone source OSC1 over the toll line of Fig. 3A or 3B, as hereinafter described, relay 220 being operatively controlled over signaling conductor 164 by the associated trunk circuit OT1 or TWT1. The retard coil 200 provides a continuous drainage path to ground potential to eliminate transients produced by relay operations in the trunk and signaling circuits. The voice amplifier 218, which provides only sufficient gain to overcome the loss of the blocking network unit 210, blocks transmission from hybrid coil HC2 to transformer T21 and converts the unbalanced to ground input circuit from transformer T21 to a balanced to ground output required for the trunk circuits OT1 and TWT1. The network unit 210 constitutes a band elimination filter, network 211 being antiresonant and network 212 series resonant at the signaling frequency to block the transmission of signaling current through amplifier 218, signal repeating being effected by direct current signals as hereinafter described.

The associated toll line of Fig. 3A or 3B is further coupled by the right windings of transformer T21, conductors 241 and 242, condenser 243, potentiometer 244 and resistors 245, 246 and 247 to the grid-cathode circuit of an amplifier comprising the triode tube 250, the anode-cathode circuit of which includes the right winding of transformer T23. Immunity to interference from low frequency noise is obtained by providing a negative feedback through condenser 248, the effect of which is increased at low frequencies by the high impedance of the by-pass condenser 249. The resistor 246 in the grid circuit effects volume limiting and a condenser 252 is connected across the output winding of transformer T23 to attenuate harmonics of the signaling frequency which may be produced due to the volume limiting action of the grid resistor 246. The resistor 251, through which positive plate voltage is applied to the anode of tube 250, together with condenser 249 also limit feedback of signaling frequency current through the anode voltage source.

The signaling circuit SC1 further comprises a sharply tuned network unit 254 consisting of network 255 which is antiresonant at the incoming signal frequency and a network 256 which is series resonant at the incoming signal frequency. The network 255 and the associated rectifier element 253 constitute a signal channel for effecting desired signal operations, the voltage across network 255 being maximum at signaling frequency; while the network 256 and electronic rectifier consisting of the right triode of tube 270 connected as a diode constitutes a guard channel which prevents false operations in response to voice, noise or other currents containing a component of the signaling frequency. The rectified voltages developed in the signal and guard channels are combined algebraically through resistors 259 and 261; and the combined voltage is applied through resistor 275 to the grid of a direct-current amplifier tube 280 to immediately operate control relay 285 in response to signaling current incoming over the associated toll line; and is applied through a delay network, consisting of condenser 267, variable resistor 268, and resistor 269 to the grid of the left triode of tube 270, which triode constitutes a direct-current amplifier, to effect the delayed operation of the signal repeating relay 290. The direct-current amplifiers are normally biased almost to cut off by a voltage dividing network comprising a negative voltage source, resistors 278, 277, 279, 273 and 274 and the heating elements of tubes 218, 250, 270 and 280. The biasing connection for the left triode of 270 is traced from the grid through resistors 269, 268, 259, 261 and 266 to the voltage dividing network; and the biasing connection for the triode 280 is traced from the grid through resistors 275, 259, 261 and 266 to the voltage dividing network. The operation of control relay 285 in response to signaling current incoming over the associated toll line, prior to the operation of signal repeating relay 290, effects the insertion of the band elimination filter 210 in the input to voice amplifier 218 to prevent the further transmission of the signaling current through the amplifier and associated trunk circuits thereby to prevent a signal response in another signaling circuit of a multilink connection so as to limit signal response to a single link, all signals incoming over the associated toll line being repeated by relay 290 as direct current signals over conductor 170 to the trunk circuits OT1 and TWT1, as hereinafter described. A relay 296 is controlled by the impulse repeating relay 290 to disable the guard channel a predetermined interval after the operation of relay 290, as hereinafter further described. Although triodes 250 and 280 are shown as being in separate envelopes, it is apparent that both may be within a common envelope. Similarly, although tube 270 is shown as a duo-triode, it is apparent that each triode may be in a separate envelope. The operation and function of all circuit elements including those above mentioned are hereinafter completely described on a call from the first to the second toll office.

The signaling circuit SC2 is identical in its components, functions and operations with the signaling circuit SC1, corresponding elements being identified by the same reference characters except for the first digit thereof.

It may be noted that the various voltage sources for these circuits are grounded, the ungrounded pole being represented in the drawings by a circle within which a negative or a positive sign indicates the polarity. The oscillators OSC1 and OSC2 which supply signaling current of desired frequency may be of conventional design. It is to be noted that the normally operated relays are shown operated and the normally non-operated relays are shown non-operated in the drawings.

Normally, that is during the times the associated toll line of Fig. 3A or 3B is idle, signaling current is being transmitted thereover from each of signaling circuits SC1 and SC2; relays 204, 220 and 230 of circuit SC1 and relays 404, 420 and 430 of circuit SC1 are not operated, the amplitude of the transmitted signaling current being at low level due to the inclusion of resistors 231 and 232 and 431 and 432 in the transmission paths. In response to the normally transmitted signaling currents, relays 285 and 290 of signaling circuit SC1 and relays 485 and 490 of signaling circuit SC2 are operated. With relay 290 operated, ground is disconnected from signaling conductor 170; and, with relay 490 operated, ground is disconnected from signaling conductor 470. Relays 296 and 496 are not operated since their windings are short-circuited by the front contacts of relays 290 and 490 respectively; the guard channel network 256 and resistor 258 are short-circuited by contacts of relay 296; and the guard channel network 456 and resistor 458 are short-circuited by contacts of relay 496. With relays 285 and 485 operated and relays 220 and 420 not operated, the band elimination filters 210 and 410 are inserted between transformers T21 and T22.

Figure 5:
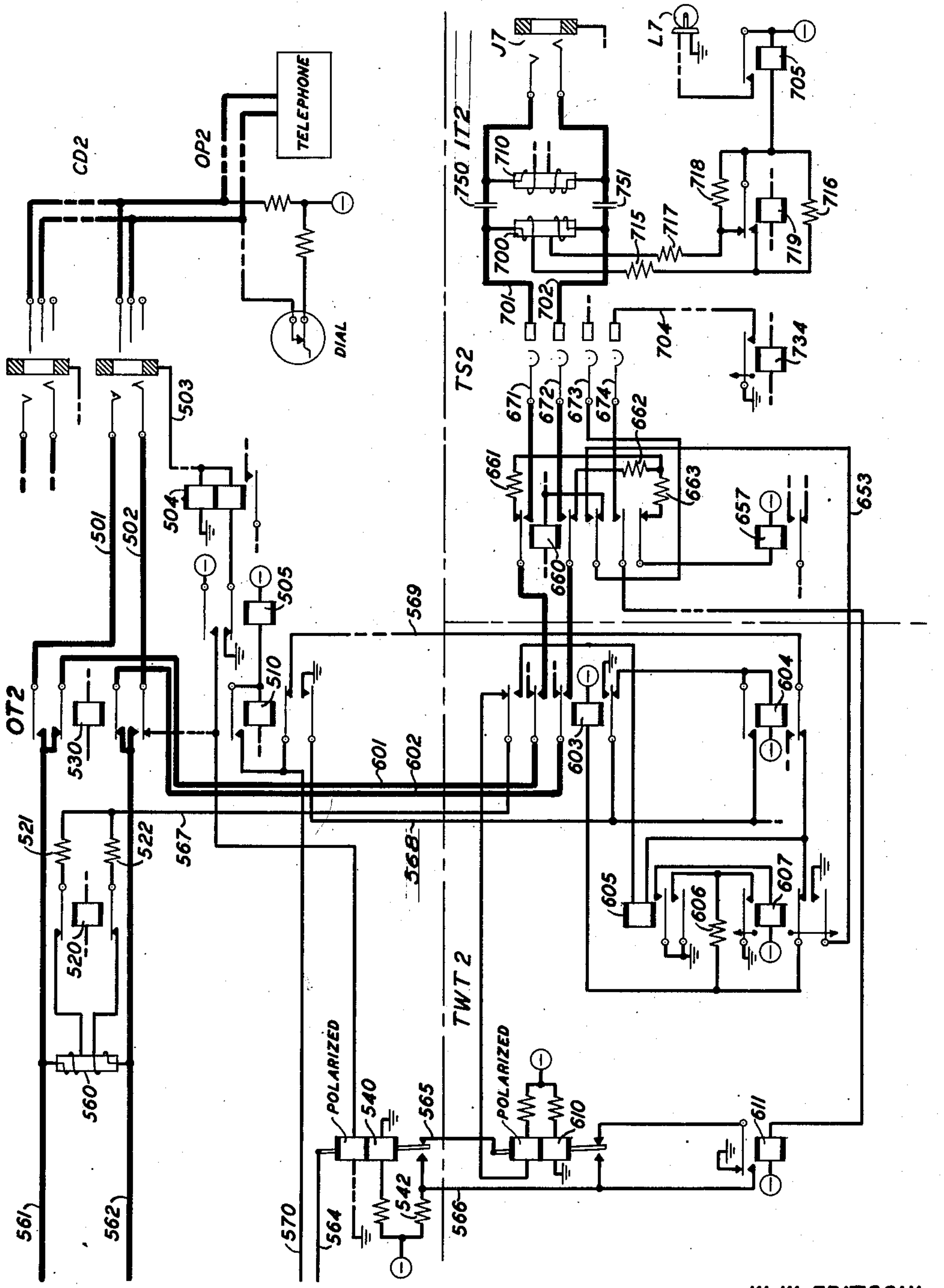

Assume now that a toll operator at a position OP1 in the first toll office (Fig. 1) has answered an incoming call either from a local office or from another toll office with the answering plug AP1 of a cord CD1 and that the call is to be extended to the second toll office (Fig. 5). The calling plug CP1 is thereupon inserted in a jack J1 of trunk circuit OT1 causing the operation of relays 22 and 104 in a circuit through the sleeve conductor and the operation of signal relay 140 in a circuit through the ring conductor of the jack. The operation of relay 104 causes the operation of relay 110, as described in the aforementioned Walsh patent. The operation of relay 110 disconnects signaling conductor 170 from conductor 169, thereby to prevent operation of relay 1003 of two-way trunk circuit TWT1 when ground is connected to signaling conductor 170 in signaling circuit SC1, and connects conductor 170 to the winding of supervisory relay 105 of trunk circuit OT1. The operation of relay 110 also connects ground to conductor 168 to operate relay 1004 of trunk circuit TWT1 and to mark trunk circuit TWT1 as busy in case this trunk circuit is selectable by toll route selectors as described in the King et al. and Walsh patents. Relay 1004 locks to conductor 168 independent of relay 1003 and further opens the connection between the winding of relay 1003 and signaling conductor 170. The operation of relay 140 closes a circuit from battery through resistor 142, front contact of relay 140, conductor 164 and winding of relay 220 of the signaling circuit SC1, operating relay 220. It being further assumed that the signaling circuits SC1 and SC2 are interconnected by the four-wire toll line of Fig. 3A, the operation of relay 220 disconnects oscillator OSC1 from conductors 301 and 302 thus terminating the transmission of signaling current over the toll line TL1. The operation of relay 220 also closes a circuit for operating relay 204 and opens a normally closed shunt through resistor 222 across tuned network 256, this shunt being normally of no effect since network 256 is normally short circuited through a back contact of relay 296 as above mentioned. The operation of relay 204 opens the connection between coil HC2 and conductors 301 and 302, connects a terminating resistor 205 across conductors 201 and 202, connects a terminating resistor 206 across conductors 301 and 302, and closes a circuit for operating relay 230. The operation of relay 230 closes a locking circuit independent of relay 204, short circuits resistors 231 and 232 to prepare for the transmission of signaling current of high level from oscillator OSC1, and opens the operating circuit of relay 204. Relay 204 is slow in releasing due to the shunting effect of resistor 203. The release of relay 204 disconnects the terminating resistors and recloses the connection between hybrid coil HC2 and toll line TL1.

The aforementioned termination of the transmission of signaling current from oscillator OSC1 over toll line TL1 due to the operation of relay 220 of signaling circuit SC1 constitutes a seizure signal which causes the release of the normally operated relays 485 and 490 of signaling circuit SC2. Relay 485 releases first and without delay thereby closing a shunt from the grid of the right triode of tube 470 through resistor 494 to the source of cathode potential, this shunt being effective when relay 496 is released to cause the release time of relay 490 to more nearly equal its operate delay on interrupted supervisory tone signals which have an "on" time long enough to release relay 496. The release of relay 490 connects ground to conductor 570, thereby causing the operation of relay 603 of trunk circuit TWT2; opens the short circuit around the winding of relay 496 causing the operation of this relay; and opens the above-mentioned path from the grid of the right triode of tube 470 through resistor 494 so as not to affect the next operation of relay 490. The operation of relay 496 prepares the signal receiver SC2 for receiving dial impulses; it connects varistor 493 across resistor 468 to aid in dissipating the charge on condenser 467; opens the short circuit across network 456; closes a short circuit across resistor 457 to increase the selectivity of network 454; opens a short circuit across varistor 463; and closes either a short circuit or a shunt across resistor 494 depending upon whether relay 430 is or is not operated. The operation of relay 496 also connects ground from a back contact of relay 420 to a permanent signal alarm circuit 499.

The aforementioned circuit for operating relay 603 is traced from ground at the back contact of relay 490, through conductor 570, lower back contact of relay 510 of trunk circuit OT2, conductor 569, back contact of relay 604 of trunk circuit TWT2, back contact of relay 607 and winding of relay 603. The operation of relay 603 connects ground to conductor 568 to guard outgoing trunk circuit OT2 from being seized on an outgoing call by an operator or a toll route selector having access thereto. Relay 603 also closes a circuit for operating relay 605, this circuit being traced from ground at the back contact of relay 490, through conductor 570, lower back contact of relay 510, conductor 569, back contact of relay 604, winding of relay 605, uppermost front contact of relay 603, conductor 567, thence in simplex through resistors 521 and 522, back contacts of relay 520, windings of retard coil 560, conductors 561 and 562, inner back contacts of relay 530, conductors 601 and 602, front contacts of relay 603, back contacts of relay 660 of toll selector TS2, resistors 661, 662 and 663 and the winding of line relay 657 of this selector. The line relay 657 is thereby operated and so also is relay 605. The operation of relay 605 closes a circuit through resistor 606 for holding relay 603 operated and closes a circuit for operating the slow-to-release relay 607. The operation of relay 607 also closes a circuit for holding relay 603 operated, opens the operating circuit of relay 603 and connects ground to conductor 653 of toll selector TS2 to hold selector TS2, and any additional toll selector through which the connection is further extended in the second toll office, until the connection is released at the first toll office. The toll selector TS2 is now ready to respond to dial impulses.

When the toll operator dials the first digit of the toll route number, relay 140 of trunk circuit OT1 is alternately released and reoperated as many times as there are units in the digit dialed. Each release and reoperation of relay 140 causes the release and reoperation of relay 220. The operate and release times of relay 220 are equalized due to the effect of the potentiometer 221. The release of relay 220 responsive to the first dial impulse of a train opens the locking circuit of relay 230 and closes a circuit for operating relay 204; and the succeeding reoperation of relay 220 at the end of a dial impulse again closes the locking circuit of relay 230 and opens the operating circuit of relay 204. Being slow in releasing, as hereinbefore described, both of relays 204 and 230 remain operated during the response of relay 220 to dial impulses. The continued operation of relay 220 at the end of the last impulse of a digit is effective to hold relay 230 operated and causes the release of relay 204.

The release and reoperation of relay 220 responsive to each dial impulse of a digital train alternately connects the tone source OSC1 to toll line TL1 and disconnects this source from toll line TL1 whereby high level impulses of tone are transmitted over the toll line, one impulse of tone for each dial impulse, to the signal receiver SC2. The first tone impulse of a train causes the reoperation of relay 485 and a delayed reoperation of relay 490. The effect of transients due to energization of the signal and guard networks is reduced by the shunt comprising resistor 422 across the guard network 456. The resistor 475 and condenser 476 minimize the effect of high frequency currents with respect to relay 485; and resistor 469 and condenser 472 minimize the effect of such currents with respect to relay 490. The operation of relay 485 closes a circuit including resistor 486 for charging condenser 491 due to the voltage drop across the winding of relay 485, this being prior to operation of relay 490 and without immediate effect. The operation of relay 485 introduces the band elimination filter unit 410 between transformer T41 and amplifier 418, thereby to stop the transmission of the tone beyond the signaling circuit SC2, the tone already passed therethrough being insufficient in duration to effect signal response; so that on built-up connections a signal response in a succeeding link can only be effected by operation of signal repeating relay 490. The operation of relay 490 is delayed by the network comprising variable resistor 468 and condenser 467, the resistor being adjusted so that relay 490 is operated by the shortest tone impulse that can be recognized with certainty as an impulse of signaling current. When relay 490 operates, it disconnects ground from conductor 570 causing the release of relay 605 of trunk circuit TWT2 and release of relay 657 of toll route selector TS2; and closes a short circuit across the winding of relay 496. Relay 496 is slow to release and remains operated during the response of relay 490 to dial impulses. The operation of relay 490 also opens the connection between condenser 491 and resistor 486 and connects condenser 491 through a back contact of relay 420, a front contact of relay 496 and variable resistor 492 to the grid of the right triode of tube 470. When the tone impulse corresponding to the first dial impulse (of a digital train of impulses) ends, relay 485 releases followed by the release of relay 490; and the release of relay 490 reconnects ground to conductor 570 to reoperate relays 605 and 657. Since it is necessary that relay 657 of selector TS2 release responsive to each dial impulse, it is necessary to make certain that relay 490 does not release before a sufficient interval to assure satisfactory impulse repeating over conductor 570. To this end, condenser 491 discharges through resistor 492 thereby maintaining the grid of the right triode of tube 470 positive to hold relay 490 operated long enough to insure release of relay 657. The variable resistors 468 and 492 are set for tone impulses of median length, for instance pulses at the rate of ten pulses per second and having fifty-five per cent break, so as to delay the operation and also the release of relay 490 for the same desired interval of time. If the incoming tone impulse terminates and releases relay 485 before the end of the minimum required output impulse over conductor 570, condenser 491 by virtue of its connection to the anode of tube 480 introduces an immediate increase in the positive potential of the grid of the right triode of tube 470 thereby augmenting the delay effect through resistor 492. Thus, in the case of short duration tone impulses, the operation of relay 490 is maintained after the incoming impulse terminates. Each succeeding impulse of a digital train effects a like operation and release of relays 485 and 490, whereby the dial impulse signals are repeated over conductor 570 to cause the alternate release and reoperation of relays 605 and 657. Relay 607 is slow to release so as to remain operated during the response of relay 657 to all of the impulses in a digital train. With relay 496 operated, varistor 493 is connected across resistor 468 to dissipate between impulses the energy stored in condenser 467 so as to insure the same delay in operating relay 490 responsive to each tone impulse in a digital train.

The operations of the signal receiver responsive to tone impulses of a digital train are as above described for impulses of median length or shorter than median length. However, if the tone impulses are so long that the charge on condenser 491 has been substantially dissipated before an incoming impulse terminates and if after a further very short interval the next tone impulse begins and relay 485 reoperates, the decrease in potential of the anode of tube 480 is transmitted through condenser 491, a front contact of relay 490 and resistor 492 to the grid of the right triode of tube 470 to hasten the release of relay 490 and thereby assure a sufficient interval between impulses transmitted over conductor 570 to effect reoperation of relays 605 and 657. To limit the effect of this decrease in potential and prevent interference with response of relay 490 to the succeeding tone impulse, an energy dissipating path is closed from the grid of the right triode of tube 470 through the inner lower front contact of relay 490, lower back contact of relay 485, inner lower back contact of relay 430 and lowermost front contact of relay 496. The release of relay 490 opens this dissipating path so that condenser 491 is restored to its usual condition at the start of the succeeding incoming tone impulse.

The dialing of additional digits effects the transmission of trains of tone impulses in like manner and completion of the desired connection. Assuming the call is routed through selector TS2 to an incoming trunk circuit IT2, relay 660 is operated and the simplex circuit is extended through the brushes of selector TS2 to the winding of line relay 705 of trunk circuit IT2. Relay 705 operates in series with relay 605 of two-way trunk circuit TWT2, lighting answering lamp L7. When the call is answered by insertion of a plug of cord CD2 in jack J7, relay 734 is operated as described in the aforementioned Walsh patent. The operation of relay 734 connects ground through conductor 704, terminal and brush 674 of selector TS2, and front contact of relay 660 to operate relay 611 of trunk circuit TWT2. The operation of relay 611 disconnects ground from conductor 564 and connects battery potential from resistor 542, through the front contact of relay 611, back contacts of relays 610 and 540 and conductor 564 to the winding of relay 420 of signaling circuit SC2. Relay 420 operates, disconnecting oscillator OSC2 from conductors 321 and 322 thereby terminating the transmission of signaling current over trunk line TL2 to signaling circuit SC1 as an answering supervisory signal. The operation of relay 420 causes in succession the operation of relay 404, the operation of relay 430 and the release of relay 404. Relay 430 locks under control of relay 420, short circuits resistors 431 and 432, opens the short circuit across resistor 433 and transfers the winding of relay 404 from the front to the back contact of relay 420. With relays 420 and 485 both operated, the band elimination filter 410 is removed from the talking path between transformer T41 and the answering operator. The operation of relay 420 also opens the short circuit across resistor 423 and opens the shunt through resistor 422 across the guard network 456 thereby increasing the guard action to insure against false release due to a signaling frequency component in the talking current. The termination of the tone signal over line TL2 causes the successive release of relays 285 and 290 of signaling circuit SC1 and the operation of relay 296. Both signaling circuits SC1 and SC2 are now in talking condition, relays 220, 230, 296 of circuit SC1 being operated and relays 420, 430 and 496 of circuit SC2 being operated, both band elimination filters 210 and 410 being cut out of the connection between the calling and called operators, and both circuits having the maximum guard action against false response to voice currents having signal frequency components.

The aforementioned insertion of resistor 423 in series with condenser 491 and resistor 492 due to the operation of relay 420 increases the release time of relay 490, this being necessary to compensate for the increased guard action (resulting from the opening of the shunt across resistor 422) in case a rering signal is received while an off-hook signal condition exists in signaling circuit SC2. For the same reason, the operation of relay 430 inserts resistor 433 in the shunt path from the grid of the right triode of tube 470 which path is closed when relay 485 releases and before relay 490 releases after the rering signal ends; whereby disconnection of ground from signaling conductor 570 for a long enough interval to repeat the rering signal is assured. Such a rering signal gives the answering operator a signal in the manner described in the aforementioned King et al. and Walsh patents.

If the selector TS2 or some succeeding selector encounters an all-trunks-busy condition, or if a called subscriber line is busy, busy signals consisting of alternate off-hook and on-hook signals are received over conductor 564 at the rate of 60 or 120 impulses per minute and are repeated by transmitting tone impulses over trunk TL2, causing the alternate operation and release of relays 285 and 290. Each tone impulse thus transmitted by the alternate operation and release of relay 420 is long as compared with dial impulses and, if long enough, relay 296 will release between successive operations of relay 290. The release of relay 296 short circuits the guard network, opens the connection between condenser 291 through resistor 292 to the grid of the left triode of tube 270, and inserts resistor 294 in the shunt path from this grid to the source of negative potential; whereby the equality between the operate and release times of relay 290 is maintained at the flashing rate and the signals transmitted by relay 290 over conductor 170 to relay 105 of trunk circuit OT1 are repeated by this relay to alternately extinguish and light the supervisory lamp CS at the calling operator's position. Since the negative transient which results from receiving a signal, during the high guard condition when relay 296 is operated, may be followed by a positive transient which might otherwise cause a momentary operation of relay 290, the varistor 263 and resistor 264 constitute a low impedance shunt across resistor 266 to dissipate the positive transient. The resistor 264 protects the varistor 263 against overload current therethrough in case of trouble grounds.

If a stop-dial signal is received by signaling circuit SC2 over conductor 564 during the establishment of a connection, relay 420 is operated and the signal is repeated as a tone signal over toll line TL2 to signaling circuit SC1 in the same manner as is an answering supervisory signal in the same direction. Thereafter when a start-dialing signal is received over conductor 564, the release of relay 420 starts the transmission of tone at a high level effecting the reoperation of relays 285 and 290 of signaling circuit SC1 and the release of relay 105, giving the calling operator a start-dial signal. Since dialing may start immediately thereafter, any echo effect due to the transmission of tone at a high level from signaling circuit SC2 over toll line TL2 is suppressed by a negative pulse transmitted from the front contact of relay 420, through condenser 425 and resistor 424, and resistor 466 to the source of cathode potential. Thus any echo of the transmitted start-dial signal will not cause a short, false operation of relay 490.

When, on the aforementioned call from an operator in the first toll office completed through trunk circuit IT2 to a toll operator in the second toll office, the answering operator disconnects, relays 734 and 611 release in succession in the manner described in the aforementioned King et al. and Walsh patents. The release of relay 611 disconnects battery from conductor 564 releasing relay 420. The release of relay 420 causes in succession the operation of relay 404, the release of relay 430 and release of relay 404. The release of relay 420 also reconnects oscillator OSC2 to toll line TL2 to cause the reoperation of relays 285 and 290 of signaling circuit SC1, followed by the release of relay 296. Relay 290 repeats the signal by releasing relay 105, and relay 105 causes the lighting of supervisory lamp CS as a disconnect signal. When the calling operator removes plug CP1 from jack J1, relays 104 and 140 release and the trunk circuit OT1 is restored to normal as described in the aforementioned King et al. and Walsh patents. The release of relay 140 disconnects battery from conductor 164 causing the release of relay 220. The release of relay 220 causes the reoperation of relay 204, opens the locking circuit of relay 230, and reconnects oscillator OSC1 to transmit a high level tone over toll line TL1 to effect the reoperation of relays 485 and 490 of signaling circuit SC2. The release of relay 230 after a predetermined interval of time reinserts resistors 231 and 232 in the tone transmission path thus reducing the signal to a low, idle indicating level. When slow-to-release relay 496 releases due to the continued operation of relay 490, it short circuits the guard network to prevent the false release of relay 490 responsive to noise or transients on the line during the idle condition. The continued disconnection of ground from signaling conductor 570, due to the reoperation of relay 490 responsive to the disconnect and idle signal, causes the release of relay 605 of trunk circuit TWT1 and the release of line relay 705 of incoming trunk circuit IT2. The release of relay 605 causes the release of relays 603 and 604; the release of relay 607 disconnects ground from conductor 653 thereby restoring selector TS2 to normal; and the release of relay 603 disconnects ground from conductor 568 thereby marking the trunk circuit OT1 idle; all of these operations being realized in the manner described in the aforementioned King et al. and Walsh patents.

It may be noted at this time that the release of relay 490 and operation of relay 496 while relay 420 is not operated closes a circuit to energize the permanent signal alarm apparatus 499; so that if a large number of signaling channels are simultaneously disabled, for instance by a cable failure, the permanent signal alarm circuit would immediately give an indication of such a condition.

If the toll line individually associated with trunk circuits OT1 and OT2 in the two toll offices, is a two-wire toll line TL3 as shown in Fig. 3B, the frequency used for signaling in one direction is different from the frequency used for signaling in the opposite direction. In this case, hybrid coils HC31 and HC32 provide the outgoing and incoming transmission paths between toll line TL3 and the two signaling circuits SC1 and SC2; and there is a blocking filter at each end of the line in the incoming transmission path tuned to block currents of the outgoing signaling frequency so that unattenuated outgoing signals will not interfere with signal operation in response to attenuated incoming signals. Thus the blocking filter 356 which is inserted in the incoming transmission path between line TL3 and transformer T21 of signaling circuit SC1 is tuned to the same frequency as oscillator OSC1 of signaling circuit SC1; and blocking filter 376 which is inserted in the incoming transmission path between line TL3 and transformer T41 of signaling circuit SC2 is tuned to the same frequecy as oscillator OSC2 of signaling circuit SC2. The filter 356 comprises networks 357 and 358 which are antiresonant and network 359 which is series resonant at the outgoing signaling frequency from signaling circuit SC1. Filter 376 comprises similar networks 377, 378 and 379 tuned to the outgoing signaling frequency from signaling circuit SC2. A relay 368 controls the insertion of the filter 356 and a relay 388 controls the insertion of filter 376 to remove the blocking filters during talking.

On a call from the second toll office to the first toll office, the operation of the various trunk and signaling circuits is similar to that of the above-described call from the first to the second toll office.

It is further to be noted that the signal transmitting relays 220, 420 and signal responsive relays 285, 290, 485 and 490 are ordinary flat type relays, a common rubber snubbing means being provided to substantially eliminate vibratory signal distortion due to dynamic weakness in the relay structure.

What is claimed is:

1. In a signaling system in which current of a particular frequency within the voice band is used to effect transmission of signals, a signal receiver comprising means for amplifying incoming currents, signal and guard tuned networks connected in the amplifier output circuit, the signal network being antiresonant and the guard network series resonant at the signal frequency, means idividual to each of said networks for separately rectifying the voltages across said networks, two signal responsive relays, electronic means individual to and controlling the operation of each of said relays, and means for combining said rectified voltages and applying the resultant voltage to both of said electronic means.

2. In a signaling system in which current of a particular frequency within the voice band is used to effect transmission of signals, a signal receiver comprising means for amplifying incoming currents, signal and guard tuned networks connected in the amplifier output circuit, the signal network being antiresonant and the guard network series resonant at the signal frequency, means individual to each of said networks for separately rectifying the voltages across said networks, two signal responsive relays, electronic means individual to and controlling the operation of each of said relays, means for combining said rectified voltages and applying the resultant voltage to both of said electronic means, and means for delaying the application of said resultant voltage to only one of said electronic means thereby to delay the operation of said one of said relays.

3. In a signaling system in which current of a particular frequency within the voice band is used to effect transmission of signals, a line over which voice currents and signaling currents of said frequency are transmitted, a signaling circuit connected to said line, said circuit comprising means for amplifying said voice and signaling currents incoming over said line, a signal network and a guard network in series coupled to the amplifier output circuit, said signal network antiresonant and said guard network series resonant at said signaling frequency, means including a rectifier and a first resistor for rectifying the voltage developed across said signal network, means including a rectifier and a second resistor for rectifying the voltage developed across said guard network, first and second relays, a first electronic valve controlling the operation of said first relay, a second electronic valve controlling the operation of said second relay, means comprising said second relay for repeating signals incoming to said circuit, means including said first and second resistors in series for combining the rectified signal and guard voltages and applying the combined voltage to the control elements of each of said valves, and means including a source of potential and a third resistor connected in series with said first and second resistors for biasing said valves sufficiently to prevent the operation of each of said relays when no voltage is developed across either of said first and second resistors, said combined voltage being ineffective to cause the operation of said relays responsive to voice current incoming over said line and effective to cause the operation of said relays responsive to signaling current incoming over said line.

4. In a signaling system and signaling circuit according to claim 3, means comprising a variable resistor and a condenser in series connected in parallel with said first resistor for delaying the application of rectified signal voltage to the control element of the thermionic valve controlling the operation of said second relay thereby to delay the operation of said second relay.

5. In a signaling system and signaling circuit according to claim 3, means comprising a variable resistor and a condenser in series connected in parallel with said first resistor for delaying the application of rectified signal voltage to the control element of the thermionic valve controlling the operation of said second relay thereby to delay the operation of said second relay, a slow-to-release third relay, means rendered effective by release of said second relay for operating said third relay, and means comprising a varistor connected across said variable resistor when said third relay is operated to dissipate the voltage across said condenser during intervals between impulses of signaling current incoming to said circuit.

6. In a signaling system and signaling circuit according to claim 3, a slow-to-release third relay, means rendered effective by release of said second relay for operating said third relay, a condenser connected to the anode of said first thermionic valve, means for charging said condenser while said first relay is operated and before said second relay operates in response to incoming signaling current, and means comprising said condenser and a variable resistor connected in series by said third relay while operated to the control element of said second valve for delaying the decay of the rectified voltage applied to the control element of said second valve upon termination of incoming signaling current thereby to delay the release of said second relay for a desired interval of time.

7. In a signaling system and signaling circuit according to claim 3, a slow-to-release third relay, means rendered effective by release of said second relay for operating said third relay, a condenser connected to the anode of said first thermionic valve, means for charging said condenser while said first relay is operated and before said second relay operates in response to incoming signaling current, means comprising said condenser and a variable resistor connected in series by said third relay while operated to the control element of said second valve for delaying the decay of the rectified voltage applied to the control element of said second valve upon termination of incoming signaling current thereby to delay the release of said second relay for a desired interval of time, means comprising a fourth relay effective when said relay is not operated to transmit signaling current from said circuit over said line, a resistor connected by a normally closed contact of said fourth relay across said guard network to reduce the effectiveness of said guard network, and resistor means inserted by the operation of said fourth relay in said series connection between said condenser and control element for reducing the delay in releasing said second relay upon termination of signaling current incoming to said circuit.

8. In a signaling system and signaling circuit according to claim 3, means comprising a variable resistor and condenser in series connected in parallel with said first resistor for delaying the application of rectified signal voltage to the control element of said second thermionic valve thereby to delay the operation of said second relay, a slow-to-release third relay, means rendered effective by release of said second relay for operating said third relay, means comprising a condenser and variable resistance connected by said third relay when operated in series between the anode of said first valve and the control element of said second valve so as to delay the decay of the signal voltage applied to said element and thereby delay the release of said second relay.

9. In a signaling system and signaling circuit according to claim 3, a slow-to-release third relay, means rendered effective by release of said second relay for operating said third relay, and means comprising an auxiliary biasing path for the control element of said second valve, said auxiliary path closed by release of said first relay upon termination of incoming signaling current while said third relay is operated until said second relay releases thereby to hasten the release of said second relay.

10. In a signaling system and signaling circuit according to claim 3, a slow-to-release third relay, means rendered effective by release of said second relay for operating said third relay, means comprising an auxiliary biasing path for the control element of said second valve, said auxiliary path closed by release of said first relay upon termination of incoming signaling current while said third relay is operated until said second relay releases thereby to hasten the release of said second relay, and additional means comprising a resistor inserted in said auxiliary biasing path in case said third relay is not operated at the time said first relay releases for decreasing the effect of said auxiliary biasing path.

11. In a signaling system and signaling circuit according to claim 3, means comprising a third relay and including normally closed contacts thereon for transmitting signaling current from said circuit over said line, and means comprising a condenser and resistor connected in series with said third resistor rendered effective by release of said third relay to increase the effect of said biasing resistor.

WALTER W. FRITSCHI.
ROBERT O. SOFFEL.
ALLAN WEAVER.

No references cited.